United States Patent [19]

Bodor et al.

[11] Patent Number: 5,126,151

[45] Date of Patent: Jun. 30, 1992

[54] ENCAPSULATION MATRIX

[75] Inventors: Zoltan Bodor, Pickering; Zdravko Dokuzovic, Mississauga, both of Canada

[73] Assignee: Warner-Lambert Company, Morris Plains, N.J.

[21] Appl. No.: 645,366

[22] Filed: Jan. 24, 1991

[51] Int. Cl.$^5$ ............................................. A23L 1/22
[52] U.S. Cl. ...................................... 426/99; 426/96; 426/5; 426/804; 426/548; 426/658; 426/305; 426/307; 426/310; 426/453
[58] Field of Search ................. 426/96, 99, 5, 804, 426/548, 658, 305, 307, 310, 453

[56] References Cited

U.S. PATENT DOCUMENTS

| | | | |
|---|---|---|---|
| 3,867,556 | 2/1975 | Darragh et al. | 426/99 |
| 4,016,337 | 4/1977 | Hsu | 426/99 |
| 4,384,004 | 5/1983 | Cea et al. | 426/5 |
| 4,465,694 | 8/1984 | Okada | 426/99 |
| 4,597,970 | 7/1986 | Sharma et al. | 426/5 |
| 4,711,784 | 12/1987 | Yang | 426/99 |
| 4,740,376 | 4/1988 | Yang | 426/99 |
| 4,804,548 | 2/1989 | Sharma et al. | 426/99 |
| 4,828,857 | 5/1989 | Sharma et al. | 426/99 |
| 4,871,558 | 10/1989 | Tackikawa et al. | 426/96 |

*Primary Examiner*—Jeanette Hunter
*Attorney, Agent, or Firm*—Richard S. Bullitt

[57] ABSTRACT

The present inventive composition concerns a composite delivery system having a substantially hydrophobic exterior comprising:

(a) an agglomerated mixture of a core material selected from the group consisting of sweeteners, flavoring agents and mixtures thereof and a matrix wherein the matrix comprises:
 (i) about 0.5% to about 20% fat soluble lecithin;
 (ii) about 65% to about 90% of an edible material having a melting point in the range of about 25° C. to about 100° C. selected from the group consisting of (a) a fatty acid having an iodine value of about 1 to about 10; (b) natural waxes; (c) synthetic waxes; and (d) mixtures thereof,
(b) about 0.5% to about 20% of a glyceride; and
(c) a silicone based anti-foaming agent in a concentration of about 0.001% to about 0.5%; said composite having a melting point in the range of about 20° C. to about 90° C.

27 Claims, 3 Drawing Sheets

EXAMPLE #3
THE EFFECT OF ANTIFOAM AGENT ON THE VISCOSITY OF APM/HPO DISPERSION

ENCAPSULATION MATRIX

FIELD OF THE INVENTION

The present invention relates to a composite delivery system and its method of preparation. More particularly, this invention relates to a method of encapsulating an artificial sweetener to improve the temperature tolerance of the encapsulating matrix when it is being processed into a final product.

BACKGROUND OF THE INVENTION

Artificial sweeteners such as L-aspartyl-L-phenylalanine methylester (aspartame) have been widely recognized as artificial sweeteners for use in a variety of food products, among which, for example, are chewing gum products. Unfortunately, aspartame and other artificial sweeteners rapidly degrade in the presence of moisture at elevated temperatures. Additionally, aspartame is known to react with a number of flavors and chemicals, such as aldehydes and ketones. For example, aspartame loses its sweetness due to chemical reactions in the presence of flavor aldehyde-containing oils such as cinnamon. These flavor oils are used in food products and are popular in chewing gum compositions and other confectionery products. Chewing gum compositions and other products also generally contain moisture and may be exposed to elevated temperatures during shelf life. This may result in the loss of aspartame and the corresponding loss of sweetness in the product. This is a particular problem with chewing gums as the sweeteners can make up from 25% to 80% of the gum, with the gum base making up the remainder of the formulation.

Numerous attempts have been made to stabilize aspartame in chewing gums as well as in other food products. U.S. Pat. No. 4,384,004 to T. CEA et al. discloses solid particles of aspartame encapsulated by a coating material selected from the group consisting of cellulose, cellulose derivatives, arabinogalactin, gum arabic, polyolefins, waxes, vinyl polymers, gelatin, zein and mixtures thereof, wherein the amount of said coating material to said methyl ester is from 1:1 to 1:10. More particularly, the coating materials include cellulose, methyl cellulose, ethyl cellulose, cellulose nitrate, cellulose acetate phthalate, carboxymethyl cellulose, hydroxyethyl cellulose, hydroxypropyl cellulose, arabinogalactin; polyethylene, polymethacrylates, polyamides, ethylenevinyl acetate copolymers, polyvinylpyrrolidone; gum arabic; paraffin wax, carnauba wax, spermaceti, beeswax; stearic acid, stearyl alcohol, glyceryl stearate, gelatin, zein and mixtures thereof.

The method of coating employed in the CEA et al. patent involves suspending the aspartame particles in a stream of air that passes through a zone of atomized liquid droplets of the coating material, so that the coating material is deposited on the surface of the aspartame. More than one coating may be used whereby the inner coating is water-soluble and the outer coating is water-insoluble.

U.S. Pat. Nos. 4,122,195 and 4,139,639, both to BAHOSHY et al., fix aspartame by preparing it with a material such as gum arabic or the reaction product of a compound containing a polyvalent metallic ion, with an ungelatinized starch acid-ester of a substituted dicarboxylic acid, by a spray drying technique, wherein the aspartame and a film former are prepared in an emulsion. However, such encapsulations have been found to have limited effectiveness in preventing degradation of moisture sensitive materials such as aspartame, since these encapsulants are hydrophilic and moisture-permeable.

U.S. Pat. No. 4,374,858 to GLASS et al. discloses an aspartame sweetened chewing gum having improved sweetness stability wherein the chewing gum piece has aspartame coated on its surface, as opposed to incorporating it in the chewing gum mix.

EPA No. 81110320.0 published Jun. 16, 1982 (Publication No. 0053844), to Ajinomoto Co., Inc., discloses a stabilized dipeptide-based sweetening composition comprising (a) from 20 to 60% by weight of solid fat, (b) from 10 to 30% by weight of emulsifier, (c) from 10 to 30% by weight of polysaccharide and (d) not more than 30% by weight of dipeptide sweetener. The disclosed composition is prepared by heating a mixture of the ingredients, cooling and pulverizing the mixture to obtain a powder or granules of the composition having a mesh size of smaller than 12. Spray drying the mixture is also disclosed.

U.S. Pat. No. 4,105,801 to DEGLIOTTI discloses a confectionery comprising a core portion and a shell enveloping the core portion, whereby the shell is formed by an intimate mixture of microcrystals of xylitol with a solid fatty substance of 0.5 to 15 parts by weight of fatty substance to each 100 parts by weight of xylitol. The fatty substance is preferably a mono-, di- or triglyceride having a melting range between 20° and 60° C.

U.S. Pat. No. 3,389,000 to TOYONAKA et al. discloses protective coatings for granular nucleoside-5-phosphates, the coatings being edible fats melting between 40°–100° C. and derived from plants and animals. Hydrogenated oils such as soybean oil, cottonseed oil, almond oil, castor oil, linseed oil, mustard oil, olive oil, grapefruit seed oil, palm oil, palm kernel oil, rapeseed oil, rice bran oil, and the like and mixtures thereof are used. This reference discloses a process of preparing a granular product from a liquid mixture of fats and nucleoside-5-phosphates which are sprayed from a pressure nozzle and the resultant granules cooled and recovered.

U.S. Pat. No. 4,382,924 to BERLING discloses liquid oral dosage forms for vitamins or pharmaceutical materials comprising an edible oil, a high potency lipid soluble sweetener such as saccharin and a lipid soluble flavorant. The edible oil may be a polyol fatty acid ester having at least four fatty acid ester groups and each fatty acid having from about 8 to about 22 carbon atoms. The oil, sweetener and flavor oil are mixed and heated and then cooled to provide a palatable liquid dosage form.

U.S. Pat. Nos. 3,949,094 and 3,976,494 both to JOHNSON, and U.S. Pat. No. 3,867,556 to DARRAGH present a general discussion of spraying fatty materials onto sweeteners and the like. U.S. Pat. No. 4,293,572 to SILVA et al. discloses the application of a dispersion of an emulsified fat with a solution of dextrin, saccharin or a polysaccharide to a food product as a barrier against moisture. U.S. Pat. No. 3,527,647 discloses a process of agglomerating particles by randomly scattering and spraying moistened particles to cause them to collide and form agglomerates.

U.S. Pat. No. 4,590,075 to WEI concerns a novel chewing gum composition having sustained flavor and sweetener release such that when chewed for long periods of time, the flavor and sweetener's perception is improved over the prior art. A novel delivery system is used which comprises an encapsulating matrix to surround flavor and sweetening agents, thereby inhibiting release of flavor and sweetener and extending their perception organoleptically. In this invention, the matrix is substantially hydrophobic in nature, with the exception of the addition of small amounts of excipients which in some cases may be water-soluble. The matrix comprises an elastomer, an elastomer solvent, a wax system and an excipient, all of which are used to encapsulate a flavor and/or sweetener and which delivers the flavor and/or sweetener very slowly over a long period of time when chewed in a chewing gum composition. The flavors and sweeteners are encapsulated in a matrix comprising at least one elastomer, at least one elastomer solvent, at least one wax system and an excipient selected from the group consisting of carbohydrates, polyhydric alcohols and mixtures thereof.

U.S. Pat. No. 4,597,970 to SHARMA et al. discloses a chewing gum composition comprising a gum base and an agglomerated sweetener delivery system capable of effecting a controlled release of core material selected from amino acid based sweeteners and other artificial sweeteners and flavoring agents and mixtures thereof. The matrix contains lecithin, at least one glyceride and an edible material having a melting point in the range of about 25° C. to about 100° C. This composition and process for coating results in a uniform and thorough coating to be applied to a core material.

U.S. Pat. No. 4,711,784 to YANG discloses the use of polyvinyl acetate in a method and composition for protecting an active ingredient and providing controlled release therefor in a chewing gum composition. The active ingredient is blended into the encapsulating composition by a melt blend which can then be cooled to a solid and ground into a particulate. U.S. Pat. No. 4,740,376 also to YANG, is similar to the invention in U.S. Pat. No. 4,711,784 except it is directed towards encapsulating a flavoring agent.

U.S. Pat. No. 4,804,548 to SHARMA et al. discloses a composition concerning a stable delivery system capable of effecting a controlled release of core material comprising at least one natural or artificial core material selected from the group consisting of a variety of natural and artificial sweeteners, drugs, medicaments, flavoring agents and mixtures thereof and a hydrophobic matrix consisting essentially of lecithin and an edible material having a melting point in the range of about 25° C. to about 100° C. consisting of fatty acids, natural waxes, synthetic waxes, and mixtures thereof. In particular, the disclosed delivery system is useful for protecting materials such as artificial sweeteners from being adversely affected by such factors as moisture, pH, temperature and reactive chemicals.

Each of the above-discussed references has its drawbacks in its effectiveness in the protection of the sweeteners. The problem relating to stabilization of sweeteners such as aspartame relates to the wettability of the aspartame crystal as well as to its morphological configuration. Aspartame is known to be rodlike, elongated, needlelike or dendritic in shape. As a result, it is very difficult to coat using ordinary mixing or spray coating techniques. To be effective as protective barriers, coatings must be able to adhere to the crystalline surface, including the needle-like tips and other shape variations of aspartame. Additionally, the coating must be capable of being applied in a film with a uniform thickness sufficient to provide a barrier against degradative factors such as moisture, pH changes, temperature changes and reactive chemicals. The coatings, in addition to being protective barriers, must be flexible enough to conform to the surface irregularities and geometrical configuration without cracking due to mechanical stresses which it is subjected to during incorporation of the sweetener into specific product applications. Attempts to coat aspartame using spray techniques to apply simple mixtures of fat and lecithin have resulted in poor wetting, spotty coating and inadequate protection against moisture and other potentially degradative factors.

It has been discovered that the simple mixing of known coating materials, such as fats, with certain other core materials, such as aspartame, does not provide adequate protection to keep the core material in a stabilized state. Fats do not provide adequate coating onto aspartame, nor do such coating materials as starch, or certain other materials such as waxes. Many of these materials require solvents and moisture for application, which have adverse effects on the stability of hydrophilic and stable materials, such as aspartame. For example, simple mixing of aspartame in liquid mixtures of traditional coating materials, e.g., fat and lecithin, has resulted in poor wetting, spotty coating, and inadequate protection against moisture and chemicals. The result is degradation of the aspartame upon exposure to these conditions. Changes in pH and temperature catalyze these degradative conditions.

The prior art techniques for preventing the degradation of aspartame and similar artificial sweeteners, along with natural sweeteners, have met with some, but not complete, success.

The process of EPA 8110320.9 (Publication No. 0053844) filed Dec. 10, 1981 is an example of the simple admixing of coating materials with aspartame. This publication discloses the simple melting and admixing of from 20 to 60% of solid fat, 10 to 30% of emulsifier, 10 to 30% of polysaccharide and not more than 30% of dipeptide sweetener. The mixture is then cooled and pulverized or spray dried. The pulverizing into fine powder, however, results in rupturing the coating, leaving the aspartame exposed. Spray drying is normally associated with the driving off of moisture or solvents.

The prior art techniques for coating difficult to coat materials such as aspartame have focused on two methods. The first method involves forming a molten mixture of the coating material with the sweetener. The mixture is then cooled and pulverized. The resultant particles represent a random attempt at completely coating or enrobing the sweetener. In the case of aspartame, this coating is not adequate protection against moisture or aldehyde-containing flavor oils and instability of the aspartame results.

The second conventional prior art technique for coating materials involves fluidized bed spray coating. This technique involves conducting a stream of the material to be coated into a zone of atomized droplets of coating material. In the case of a material such as aspartame, this method is very difficult to carry out. Aspartame is a low density material, has a large surface-to-weight ratio, and poor wetting characteristics. For these reasons, spray coating of aspartame in a fluidized bed system is difficult to perform successfully.

The process of U.S. Pat. No. 4,804,548 is an improved spray congealing technique and includes additional coating steps. However, the use of fatty acids presents problems of their own. Fatty acids are difficult to attach to the sweeteners.

This was overcome by the use of a glyceride and lecithin which aids both the dispersion of core material and attachment of fatty acids. The dispersion process, using high speed mixing, however, promotes a surface interaction between the glyceride, lecithin and air, resulting in foaming. The spray congealing processing of the sweetener matrix was found to be adversely affected by foaming, often resulting in premature congealing of the matrix prior to spraying.

The instant composition overcomes these problems by using an anti-foaming agent with the glyceride and lecithin, thus facilitating the attachment of the fatty acids to the active core. The addition of the anti-foaming agent to the fat/dispersion melt prior to dispersing the active ingredient improves the encapsulation (spray congealing) process. The viscosity of the dispersion can accommodate a higher percentage of the active ingredient without congealing. The addition of the anti-foaming agent is also effective in reducing moisture-induced congealing in the active core/fat dispersions.

SUMMARY OF THE INVENTION

Figure 1:
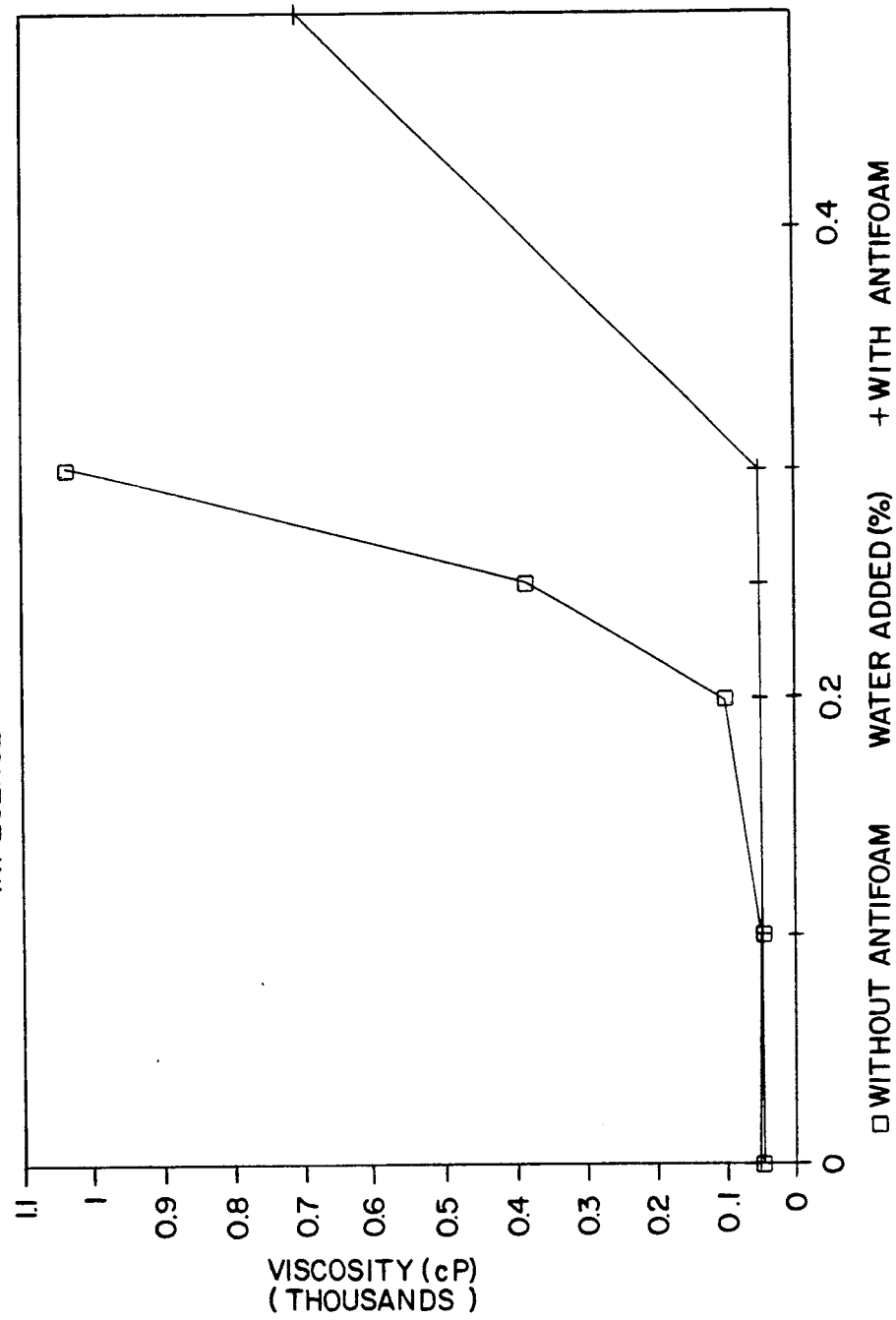
FIG. 1 is a graph showing the influence of an anti-foaming agent on the viscosity of an aspartame core matrix in the presence of water.
Figure 2:
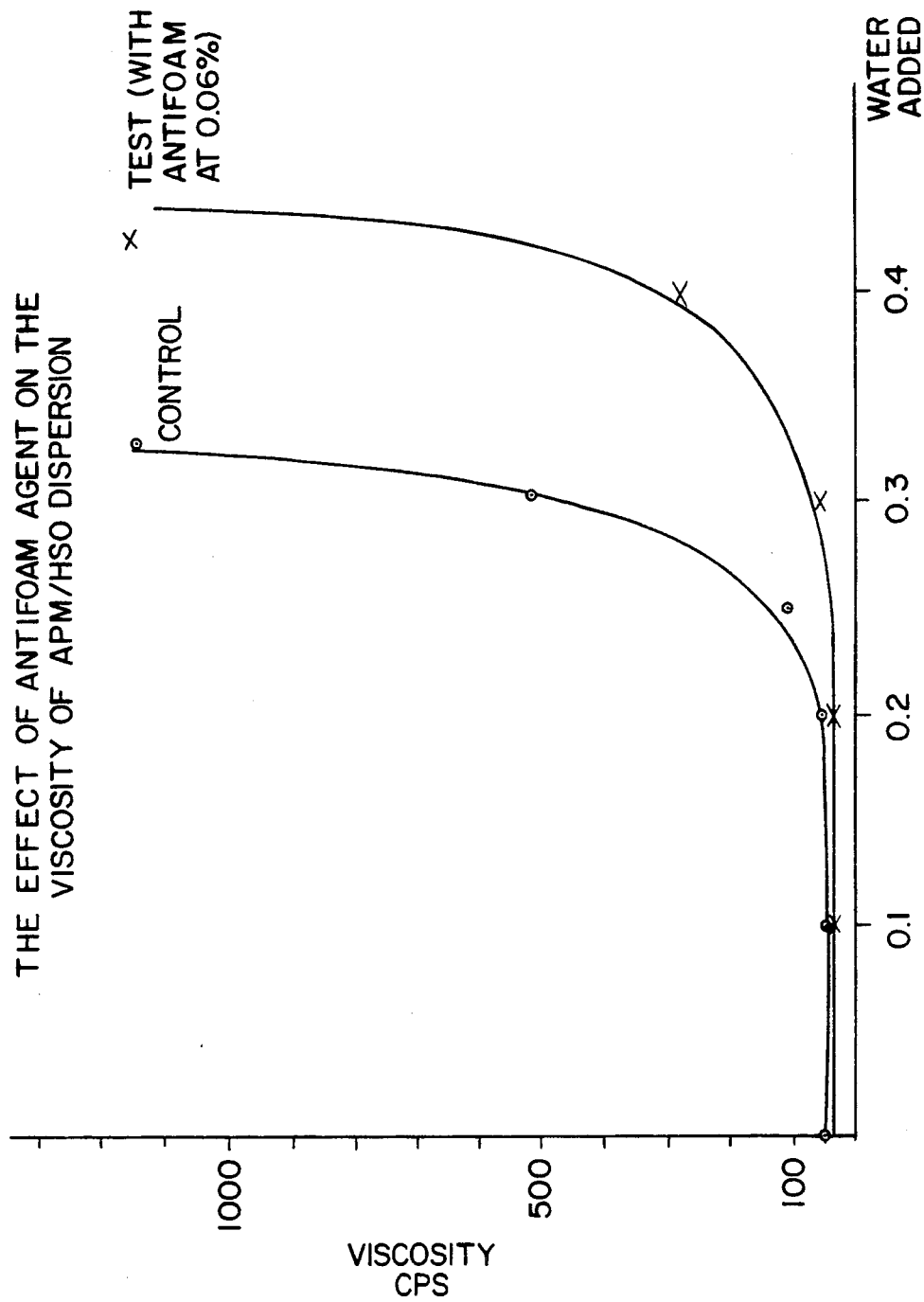
FIG. 2 is a graph showing the effect of an anti-foaming agent on the viscosity of an aspartame/hydrogenated soybean oil dispersion.
Figure 3:
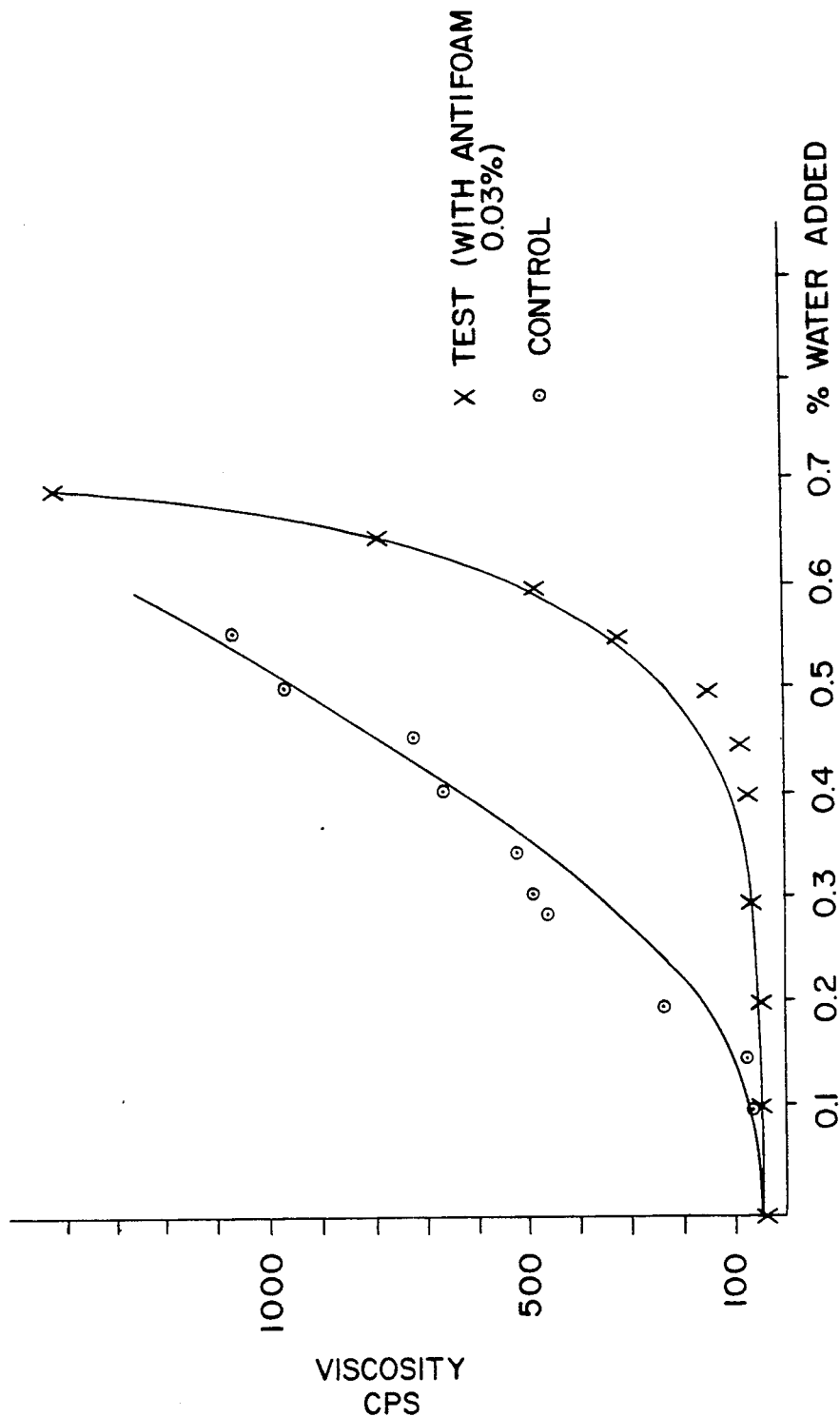
FIG. 3 is a graph showing the effect of an anti-foaming agent on the viscosity of an aspartame/hydrogenated palm oil dispersion.

This invention involves the use of an anti-foaming agent in a composite delivery system, to encapsulate an active core such as a sweetener. This system improves the temperature tolerance of the encapsulation and finds wide utility in food products, and in particular chewing gums. The addition of an anti-foaming agent to the fat/dispersion melt improves the encapsulation process. The dispersion can be maintained stable for a longer period of time and can accommodate a higher percentage of active ingredients without congealing. There have been instances of dispersion congealing in bulk during processing, which was believed to be due to physical surface interactions of the sweetener and the matrix. The presence of moisture is also found to cause rapid and irreversible congealing of the dispersion. Laboratory tests performed have shown that the addition of the anti-foaming agent is effective in reducing moisture-induced congealing of the active core/fat dispersions. As shown by FIGS. 1, 2, and 3, the addition of the anti-foaming agent is effective in reducing moisture-induced congealing in the active core/fat dispersion.

The composite delivery system of the invention has a substantially hydrophobic exterior which comprises an agglomerated mixture of an active core material selected from the group consisting of sweeteners, flavoring agents and mixtures thereof and a matrix.

A preferred embodiment involves a matrix comprising about 0.5% to about 20% fat soluble lecithin, about 65% to about 90% of an edible material, with the edible material having a melting point in the range of 25° C. to about 100° C. selected from the group consisting of: (a) a fatty acid having an iodine value of about 1 to about 10; (b) natural waxes; (c) synthetic waxes; and (d) mixtures thereof. There is also about 0.5% to about 20% of a glyceride in the composite delivery system, as well as a silicone based anti-foaming agent in a concentration of about 0.001% to about 0.5%. The composite has a melting point in the range of about 20° C. to about 90° C. and the delivery system contains less than 0.3% water.

The preferred sweetening agents may be selected from the group consisting of water-soluble sweetening agents, water-soluble artificial sweeteners, dipeptide based sweeteners, and mixtures thereof. The sweetener may be selected from the water-soluble group consisting of xylose, ribose, glucose, mannose, galactose, fructose, dextrose, polydextrose, cellulose, sucrose, maltose, partially hydrolyzed starch or corn syrup solids, palatin (isomalt), sorbitol, xylitol, mannitol, maltitol, and mixtures thereof. The sweetener could also be selected from the group consisting of sodium saccharin, calcium saccharin, saccharin acid, cyclamate salts, chlorosucrose derivatives, glycyrrhizin, acesulfame-K, L-aspartyl-L-phenylalanine methyl ester, dihydrochalcone, 3,4-dihydro-6-methyl-1,2,3-oxathiazine-4-1-2,2-dioxide, steviosides, talin, and mixtures thereof.

In general, the amount of sweetener will vary with the amount of sweetness desired for a particular product. This amount will normally be 0.005 to about 55% by weight. The water-soluble sweeteners are preferably used in amounts of about 5% to about 35% by weight, and most preferably from about 10% to about 35% by weight of the final product. In contrast, the artificial sweeteners are used in amounts of about 0.005% to about 30.0% and most preferably about 0.05% to about 20.0% by weight of the final product. These amounts are ordinarily necessary to achieve a desired level of sweetness independent from the flavor level achieved from flavor oils. In a preferred formulation aspartame may be present in an amount of 0.01% to about 30% whereas saccharin and its salts may be present in amounts of about 0.05% to about 8.0% by weight. There could also be a combination of sweeteners of up to about 5.0% aspartame, about 0.5% to about 8.0% saccharin and its salts, and about 0.5% to about 8.0% potassium acesulfame (acesulfame-K).

The fatty acid may be selected from the group consisting of hydrogenated palm oil, hydrogenated palm kernel oil, hydrogenated peanut oil, hydrogenated rapeseed oil, hydrogenated rice bran oil, hydrogenated soybean oil, hydrogenated cottonseed oil, hydrogenated sunflower oil, partially hydrogenated soybean oil, partially hydrogenated cottonseed oil, candellila wax, carnauba wax and mixtures thereof.

The anti-foaming agent may be selected from the group consisting of polydimethylsiloxane, dimethyl polysiloxane, silicone fluid, silicone anti-foam emulsion, silica gel, silicon dioxide, compounded silicone fluid, and simethicone.

The glyceride is selected from the group consisting of monoglycerides, diglycerides, glyceryl monostearate, glyceryl tristearate, glyceryl tripalmitate, and mixtures thereof. The glyceride may be a monoglyceride of a fat selected from the group consisting of soybean oil, palm oil and lard.

Another embodiment of the invention involves a method of preparing a composite delivery system having a substantially hydrophobic exterior which comprises preparing an encapsulating matrix containing about 0.5% to about 20% fat soluble lecithin and about 65% to about 90% of an edible material having a melting point in the range of about 25° C. to about 100° C.

selected from the group consisting of: (a) a fatty acid having an iodine value of about 1 to about 10; (b) natural waxes; (c) synthetic waxes; and (d) mixtures thereof. The fatty acid/wax matrix is first melted at a temperature above about 70° C. using a suitable heated container, and the glyceride component is then added and melted. The antifoaming agent is added and dispersed in the matrix, and then lecithin is added and dispersed.

The sweetening agent is dispersed last and mixed well at high speed, until a homogeneous mixture is obtained.

The matrix mixture dispersion is then spray congealed at a temperature above about 60° C. through a suitably equipped spraying system into an air cooled chamber.

The spray rate should be maintained at about 250 to about 600 grams per minute, with an atomizing air pressure set at about 25 to about 45 p.s.i.g. The size of the granules that will be produced will vary in size from about 10 microns to about 400 microns in diameter. The encapsulating matrix material performs best when melted at a temperature between 70° C. and 85° C., and the dispersion is best maintained at a temperature between 70° C. and 85° C. as it is dispersed.

DESCRIPTION OF THE PREFERRED EMBODIMENTS

The present inventive compositions concern a stable composite delivery system capable of effecting a controlled release of core material which comprises:

(a) an agglomerated mixture of a core material selected from the group consisting of sweeteners, flavoring agents and mixtures thereof and a matrix wherein the matrix comprises:

(i) about 0.5% to about 20% fat soluble lecithin;

(ii) about 65% to about 90% of an edible material having a melting point in the range of about 25° C. to about 100° C. selected from the group consisting of (a) a fatty acid having an iodine value of about 1 to about 10; (b) natural waxes; (c) synthetic waxes; (d) and mixtures thereof, (b) about 0.5% to about 20% of a glyceride; and (c) a silicone based anti-foaming agent in a concentration of about 0.001% to about 0.5%; said composite having a melting point in the range of about 20° C. to about 90° C.

Lecithin is critical to the hydrophobic matrix and is believed to serve several important purposes. Most importantly, lecithin acts as a wetting agent to increase the affinity of the fat or wax to the core material surface by decreasing the contact angle between the fat or wax and the core material. Fat and wax are ordinarily not compatible with certain crystalline sweeteners such as aspartame. The lecithin mediates the poor affinity between these materials and allows for uniform wetting of the aspartame surface by the fat or wax. Uniform wetting of the surface is critical to proper adherence of the hydrophobic matrix coating and to the effectiveness of the ultimate protection it provides for the core material.

Secondly, lecithin serves as a modifier of the rheological and thermal properties of the fat which lends it the capability of forming an elastic (nonbrittle) and flexible film over a wider temperature range. Ordinary fat without lecithin would result in a brittle, porous crystalline coating which would be vulnerable to rupture during processing and which would fail to uniformly wet the core material surface. Additionally, lecithin acts to modify the morphological properties of the fat or wax, as well as to increase their heat capacity, thereby retarding liquid to solid phase transitions and allowing for increased flexibility in processing conditions, e.g., the mixture can be processed in a specified temperature range for a longer period of time. The increased heat capacity plays an important role in the final delivery system since more heat will be required before the system melts down and releases the core material. Thus, at short exposures to elevated temperatures, the delivery system will be more stable than without the addition of lecithin.

The high bulk density and high surface area to weight ratio of core materials such as aspartame make them generally difficult to coat. Lecithin increases the viscosity of the fat which facilitates their incorporation.

The *Condensed Chemical Dictionary*, 9th edition, Van Nostrand Reinhold, 1977, defines lecithin as mixtures of diglycerides of fatty acids linked to the choline ester of phosphoric acid. Lecithins are classed as phosphoglycerides or phosphatides. In the instant invention, the lecithin preferably has a minimum of about 95% by weight of phosphatide present. This purity level is generally designated in commercially available lecithins as "95% acetone insolubles." The phrase "95% acetone insolubles" is intended to mean that upon dissolution of the lecithin in acetone, 95% of the lecithin (the phosphatide portion) remains insoluble. Residual impurities such as oil, moisture and soluble nonphosphatides account for the 5% of the materials dissolved and extracted by the acetone. More preferably, the lecithin employed will have 97% insolubles. Additionally, it is required that the lecithin be soluble in the fatty acid or wax. This is necessary for the lecithin to perform its various functions described above. The lecithin employed does not have a defined melting point range but softens prior to decomposition.

The second required constituent in the hydrophobic matrix coating of the delivery system is an edible material which is itself hydrophobic and which has a melting point in the range of about 25° C. to about 100° C. Those materials which are useful are selected from the group consisting of fatty acids, natural synthetic waxes and mixtures thereof. It is important that the melting point be within the recited range since the melting point of the final delivery system product will be greatly affected by the fat or wax constituent.

Those fatty acids which are useful must have an iodine value of about 1 to about 10. The iodine value is a means of determining the degree of unsaturation in fats and oils. The measurement of iodine values are determined by known titrating methods and are reported in terms of centigrams of iodine absorbed per gram of fat and oil sample. (See *Bailey's Industrial Oil and Fat Products*, Vol. 2, 4th Ed., Swern, Daniel ed., pp. 436-438, (1982)). Thus, those fatty acids useful in the inventive systems have an iodine value of about 1 centigram to about 10 centigrams.

Examples of the fatty acids employed include those selected from the group consisting of hydrogenated palm oil, hydrogenated palm kernel oil, hydrogenated peanut oil, hydrogenated rapeseed oil, hydrogenated rice bran oil, hydrogenated soybean oil, hydrogenated cottonseed oil, hydrogenated sunflower oil, partially hydrogenated soybean oil, partially hydrogenated cottonseed oil, and mixtures thereof.

Those waxes which are useful include natural waxes such as animal waxes, vegetable waxes, petroleum waxes and synthetic waxes having a melting point within the range of about 25° C. to about 100° C. and being edible. Specific examples of waxes which fall within these categories include beeswax, lanolin, bayberry, sugar cane, candellila, carnauba, paraffin, microcrystalline, petrolatum and carbowax. Mixtures of these waxes may be used as well as mixtures of the waxes with the fatty acids.

The edible fatty acid or wax materials are employed in the instant delivery systems in amounts by weight of about 65% to about 90% and most preferably in amounts of about 66% to about 80%. These amounts are necessary to adequately coat the surface of sweeteners such as aspartame which have a high surface area to weight ratio. Hydrogenated palm oil is the most preferred fatty acid. Paraffin wax and microcrystalline wax are the preferred waxes.

The edible fatty acid or wax component is critical to the effectiveness of the protective barrier. The hydrophobic matrix, of which the fatty acid or wax is an essential part, provides protection for the core material from heat, light, moisture, pH, reactive chemicals and the like. Additionally, the release of the core material is controlled via the hydrophobic matrix and can serve other purposes such as the masking of taste for unpalatable or unpleasant tasting materials.

The term glyceride component used herein refers to commonly identified glycerides which are esters of glycerol and fatty acids in which one or more of the hydroxyl groups of the glycerol have been replaced by acid radical. Mono- and diglycerides are preferred, whereas triglycerides alone are not acceptable.

The mono- or diglyceride component of the hydrophobic coating matrix serves to increase the affinity between the fatty acid or wax and the core material. In addition, for core materials which are water-soluble such as aspartame, the mono- or diglyceride component also serves to help the fat adhere to and wet the sweetener surface. Flexibility and elasticity of the matrix once it forms the film or coating on the core material is increased due to the glyceride component.

The glycerides are present in amounts of about 0.5 to about 20% by weight of the delivery system. Preferably the glyceride is used in amounts of about 0.5 to about 7% and most preferably about 1% to about 3% by weight. It should be recognized that mixtures of mono- and diglycerides may be used, since most available glyceride materials are mixtures of mono- and diglycerides.

The addition of the anti-foaming agent to the fat/dispersion melt, prior to dispersing the active ingredient (sweeteners, acids, flavoring agents) improves the encapsulation process. The addition of anti-foaming agents is effective in reducing moisture-induced congealing in active core/fat dispersions. This is evidenced by the fact that the viscosity of the dispersion can be maintained stable for a longer time period and the dispersion can accommodate a higher percentage of active ingredient without congealing.

The anti-foaming agents are silicon based and are in concentrated or emulsion form when the delivery system is formed. As discussed above, the anti-foaming agents are preferably selected from the group consisting of polydimethylsiloxane, dimethyl polysiloxane, silicone fluid, silicone anti-foam emulsion, silica gel, silicon dioxide, compounded silicone fluid, and simethicone. The most preferred anti-foaming agent is polydimethylsiloxane, identified as Poly-Dimethyl-Siloxane (PDMS) by Dow Corning. The amount used is about 0.001% to about 0.5% by weight with the preferred range being about 0.01 to about 0.05%.

The core material can be selected from a wide variety of materials such as sweeteners, medicaments, drugs, flavoring agents and the like. These materials can be used either singly or in combination in either a single or multiple delivery system. That is, one or more of these materials may be present within one coating matrix or separately coated by the matrix and employed alone or in combination in a final product.

The sweetener component may be selected from solid natural or synthetic sweeteners capable of imparting high intensity sweetness.

The medicament drugs used herein may be selected from a wide variety of drugs and their acid addition salts. Both organic and inorganic salts may be used provided the drug maintains its medicament value and is soluble in the solvent. Exemplary acid salts include hydrochloride, hydrobromide, orthophosphate, benzoate, maleate, tartrate, succinate, citrate, salicylate, sulfate, and acetate.

The weight percent of the drug or its acid addition salt thereof, based on the weight of the coating matrix is preferably from about 1% to about 20%, and most preferably about 5% to about 15%, which amounts will vary depending upon the therapeutic dosage permitted.

Suitable categories of drugs that may be employed in the instant composite may vary widely and generally represent any stable drug combination. Illustrative categories and specific examples include:

(a) Antitussives, such as dextromethorphan, dextromethorphan hydrobromide, noscapine, carbetapentane citrate, and chlophedianol hydrochloride;

(b) Antihistamines, such as chlorpheniramine maleate, phenindamine tartrate, pyrilamine maleate, doxylamine succinate, and phenyltoloxamine citrate;

(c) Decongestants, such as phenylephrine hydrochloride, phenylpropanolamine hydrochloride, pseudoephedrine, hydrochloride ephedrine;

(d) Various alkaloids, such as codeine phosphate, codeine sulfate and morphine; and (e) Mineral supplements such as potassium chloride and calcium carbonates.

These materials may be used alone or in combination within the ranges specified above.

These flavoring agents may be chosen from synthetic flavoring liquids and/or liquids derived from plants, leaves, flowers, fruits and so forth, and combinations thereof. Representative flavoring liquids include: spearmint oil, cinnamon oil, oil of wintergreen (methylsalicylate) and peppermint oils. Also useful are artificial, natural or synthetic fruit flavors such as citrus oil including lemon, orange, grape, lime and grapefruit and fruit essences including apple, strawberry, cherry, pineapple and so forth.

The amount of flavoring agent employed is normally a matter of preference subject to such factors as flavor type, base type and strength desired. In general, amounts of about 0.05% to about 3.0% by weight are usable with amounts of about 0.3% to about 1.5% being preferred and about 0.7% to about 1.2% being most preferred.

The method of preparing the delivery system involves first forming an agglomeration of the core material and the hydrophobic matrix. The agglomerates are then screened to obtain particles of about 200 to about 30 mesh and then coated with one or more layers of hydrophobic material to provide a protective barrier. The agglomerate is formed by mixing at low shear the fatty acid or wax with the anti-foaming agent and with the glyceride and lecithin at temperatures above about 60° C. until a homogeneous mixture is obtained. The core material or combination of core materials are then added to this mixture and mixed at high shear to uniformly disperse the material in the mixture. The dispersion is then fed into a heat controlled spray nozzle and spray congealed. The term spray congealed as used herein refers to the solidification of the atomized liquid droplets which cool and solidify upon hitting the cooler temperature of the surrounding atmosphere. The nozzle pressure is regulated to control the particle droplet size. The droplets cool and congeal once they are emitted from the nozzle and contact the cooler environment. The result is a dry particle or agglomerate having an approximately elliptical or spherical shape. In this state, core material particles are bound together with the hydrophobic matrix, but not adequately coated to fully protect the core material from the environment. The agglomerated particles are then screened to the desired size as mentioned above.

A second coating step of the process may now be used to provide a further protective barrier and in this regard the agglomerate is coated using standard fluidized bed granulation procedures.

The second coating (e.g., the coating of the agglomerate) may use the hydrophobic matrix. It should be mentioned, however, that the outer coating need not have the lecithin and glyceride components present since wetting of the core material surface is not critical at this point, having been accomplished in the first coating. Thus, the outer coating need only have the fatty acid and wax component and anti-foaming agent. Preferably the outer coating comprises hydrogenated palm oil and paraffin wax in respective amounts of about 61% to about 90% and about 10% to about 40% with 0.02% anti-foaming agent. The final product is a fine dry particle and is referred to herein as the delivery system. The delivery system preferably has a melting range of about 20° C. to about 90° C. and most preferably a melting range of about 35° C. to about 38° C., such that it melts and releases the core material within the normal body temperature range of humans.

As an alternative but less preferred method, the homogeneous mixture of hydrophobic matrix and core material can be allowed to cool in sheets and subsequently pulverized to a particle size of about 30 to about 200 U.S. standard mesh size (about 600 to about 75 microns.) The pulverized particles can then be coated with the hydrophobic mixture using standard fluidized bed granulation techniques. An additional alternative method of forming the delivery system comprises spray drying the core material with a known binder such as cellulose or polyvinyl pyrrolidone and the like to form an aggregate. The aggregate is then coated with the hydrophobic coating matrix using conventional fluidized bed granulation techniques well known to the skilled artisan. The alternative methods, however, are not as effective in preparing the delivery systems as the preferred method.

It is important to note that the preferred inventive process involving spray congealing of the liquid hydrophobic coating matrix-core material followed by fluidized bed granulation results in a significantly and surprisingly improved coating for protection of the core material. Either spray congealing or fluidized bed granulation alone does not provide adequate protective coatings for the delivery system and results in instability and premature release of the core material. The congealing step forms an agglomerate of the core material and hydrophobic matrix. The matrix binds together the core particles but only partially coats the core. The core material is "randomly" coated in the sense that is pure chance that the matrix completely coats or enrobes the material, particularly if the material is difficult to coat.

Fluidized bed granulation is necessary to achieve the uniform coating necessary to protect the core material. For example, with rodlike or needlelike shaped sweeteners such as aspartame, the spray congealing orients the aspartame crystals into an agglomeration which is significantly easier to coat, e.g., the agglomerate approximates an elliptical or spherical shape (see FIG. 2), which is then easily uniformly coated in the fluidized bed. Fluidized bed coating alone of sweeteners such as aspartame does not provide a uniform protective coating.

The effectiveness of the protective barrier or coating afforded by the hydrophobic matrix to the core material is dependent not only on the completeness of the surface area coated, but also on the thickness of the coating. The external hydrophobic matrix thickness is approximated as a function of the total amount of hydrophobic matrix present as follows:

| Coating* | Thickness** | Dissolution*** |
|---|---|---|
| 300% | 29 | N.D. (not detectable) |
| 200% | 22 | N.D. |
| 100% | 13 | N.D. |
| 50% | 7 | 0.3% |
| 30% | 3 | 7.57% |
| 0% | 0 | 17.64% |

*percentage of outer coating of hydrophobic matrix by weight of intermediate agglomerate.
**indicates the relative thickness of the outer coating over the agglomerate as a percentage of the diameter of the agglomerate itself.
***delivery system placed in water at 25° C. for 1 hour. Percentage indicates the amount of aspartame extracted by water.

As evidenced in the above table, the thickness of the exterior, secondary coating (e.g., the fluidized bed coating of the agglomerate) is greater when a higher weight percentage of coating is used. The thicker coating maximizes the protection of the core material, in this case aspartame.

A balance must be maintained, however, such that too thick a coating is not used so as to prevent proper release of the core material. It has been determined that using the exterior coating in amounts of about 200 to about 300% by weight of the agglomerate maximizes the protective benefits with the controlled release benefits. Use of the exterior coating in amounts less than about 30% by weight of the agglomerate does not provide thickness sufficient for protection of core material. As evidence by the table above, the less coating used the lower the coating thickness and the higher the dissolution of the core material (sweetener) from the delivery system, as indicated by the dissolution data. These data were determined by stirring a specified amount of the delivery system in water at 25° C. for 1 hour. The amount of core material (sweetener) dissolved by the water was then measured and used as an indicator of the effectiveness of the coating as a moisture barrier. As the data values indicate, no sweetener (aspartame) was detectable in the water where the coating was greater than 200% by weight of the agglomerate. This indicates that the coating thickness and uniformity were extremely effective in preventing moisture from penetrating and reacting with the aspartame. Coatings which were 30% or less by weight of the agglomerate showed significant percentages of aspartame detected by the dissolution assay, indicating penetration of the water through the coating. When no coating was used on the agglomerate, significant dissolution of the aspartame occurred.

The delivery system in its final form is a dry spherical particulate having a U.S. standard mesh size of about 200 to about 30 and preferably about 150 to about 70.

The delivery system can be used to protect materials such as sweeteners, drugs, medicaments, flavoring agents and the like. The delivery systems provide an excellent means of masking unpleasant tasting drugs such as potassium chloride and the like, making consumption of the drug more appealing to the public.

The delivery system in its final form may be referred to as a composite. The composite is useful in a variety of food products, medicaments, baked goods, pharmaceutical preparations, tobacco and proprietary products such as toothpaste and mouthwash, and the like. Once prepared, the composite may be stored for future use or formulated with conventional additives, that is, pharmaceutically acceptable carriers and confectionery ingredients to prepare compositions which offer a variety of textures to suit particular applications. Such compositions may be in the form of a lozenge, stored for future use or formulated with conventional additives, that is pharmaceutically acceptable carriers and confectionery ingredients to prepare compositions which offer a variety of textures to suit particular applications. Such compositions may be in the form of a lozenge, tablet, toffee, nougat, chewy candy, chewing gum and so forth. The pharmaceutically acceptable carriers may be selected form a wide range of materials. Without being limited thereto, such materials include diluents, binders and adhesives, lubricants, disintegrants, colorants, flavorings, sweeteners and miscellaneous materials such as buffers and adsorbents in order to prepare a particular medicated composition. The preparation of confectionery and chewing gum products is historically well known and has changed very little over the years.

Lozenges are flavored medicated dosage forms intended to be sucked and held in the mouth. They may be in the form of various shapes, the most common being flat, circular, octagonal and biconvex forms. The lozenge bases are generally in two forms, hard boiled candy lozenges and compressed tablet lozenges.

The hard boiled candy lozenges are prepared from a mixture of sugar and other carbohydrates that are kept in an amorphous or glassy condition. This form can be considered a solid syrup of sugars generally having form 0.5 to 1.5% moisture. Such materials normally contain up to 92% corn syrup, up to 55% sugar and from 0.1% to 5.0% water. The syrup component generally is prepared from corn syrups high in fructose, but may include other materials. Further ingredients such as flavorings, sweeteners, acidulants, colorants and so forth may also be added. In contrast, compressed tablet lozenges contain particular materials and are formed into structures under pressure. They generally contain sugars in amounts up to 95% and typical tablet excipients such as binders and lubricants as well as flavors, colorants and so forth. The lozenges may be made of soft confectionery materials such as those contained in a nougat. These materials contain two primary components, namely a high boiling syrup such as corn syrup or the like, and a relatively light textured frappe, generally prepared from gelatin, egg albumen, milk proteins such as casein, and vegetable proteins such as soy protein, and the like. The frappe is generally relatively light, and may, for example, range in density from about 0.5 to about 0.7 g/cc.

By comparison, the high boiling syrup, or "bob syrup", is relatively viscous and possesses a higher density, and frequently contains a substantial amount of sugar. Conventionally, the final nougat composition is prepared by the addition of the "bob syrup" to the frappe under agitation, to form the basic nougat mixture. Further ingredients such as flavorings, oils, additional sugar and the like may be added thereafter also under agitation. A general discussion of the composition and preparation of nougat confections may be found in B. W. Minifie, *Chocolate, Cocoa, and Confectionery: Science and Technology*, 2nd edition, AVI Publishing Co., Inc., Westport, Connecticut (1980), at Pages 424–425.

Pharmaceutical tablets of this invention may also be prepared in chewable forms. Chewable forms are particularly advantageous because of convenience and patient acceptance and rapid onset of bioactivity. To achieve acceptable stability and equality as well as good taste and mouth feel several considerations are important, namely amount of active substance per tablet, flavor, compressibility and organoleptic properties of the drug.

The preparation of chewable medicated candy is prepared by procedures similar to those used to make soft confectionery. This procedure generally involves the formation of a boiled sugar-corn syrup blend to which is added a frappe mixture. The boiled sugar-corn syrup blend may be prepared from sugar and corn syrup blended in parts by weight ratio of 90 to 10: 10 to 90. This blend is heated to temperatures above 250° F. to remove water and to form a molten mass. The frappe is generally prepared from gelatin, egg albumen, milk proteins such as casein, and vegetable proteins such as soy protein, and the like which are added to a gelatin solution and rapidly mixed at ambient temperature to form an aerated sponge-like mass. The frappe is then added to the molten candy base and mixed until homogenous at temperatures between 150° F. and 250° F. The composite can then be added as the temperature of the mix is lowered below the melting point of the matrix whereupon additional ingredients are added such as flavors, and colorants. The formulation is further cooled and formed into pieces of desired dimensions.

A general discussion of lozenge and chewable tablet forms of confectioneries may be found in H. A. Lieberman and L. Lachman, *Pharmaceutical Dosage Forms: Tablets*, Volume Marcel Dekker, Inc., New York, N.Y., at pages 289 to 466.

With regard to the chewing gum formulation in which the novel delivery system may be employed, the amount of gum base employed will vary greatly depending on various factors such as the type of base used, consistency desired and other components used to make the final product. In general, amounts of about 5% to about 45% by weight of the final chewing gum composition are acceptable for use in chewing gum compositions with preferred amounts of about 15% to about 25% by weight. The gum base may be any water-insoluble gum base well known in the art. Illustrative examples of suitable polymers in gum bases include both natural and synthetic elastomers and rubbers. For example, those polymers which are suitable in gum bases include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene and polyvinylacetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin, and partially hydrogenated methyl ester of rosin, such as polymers of α-pinene or β-pinene; terpene resins including polyterpene and mixtures thereof. The solvent may be employed in an amount ranging from about 10% to about 75% and preferably about 45% to about 70% by weight to the gum base.

A variety of traditional ingredient such as plasticizers or softeners such as lanolin, stearic acid, sodium stearate, potassium stearate, glyceryl triacetate, glycerine and the like, for example, natural waxes, petroleum waxes, such as polyurethane waxes, paraffin waxes and microcrystalline waxes may also be incorporated into the gum base to obtain a variety of desirable textures and consistency properties. These individual additional materials are generally employed in amounts of up to about 30% by weight and preferably in amounts of from about 3% to about 20% by weight of the final gum base composition.

The chewing gum composition may additionally include the conventional additives of flavoring agents, coloring agents such as titanium dioxide, emulsifiers such as lecithin and glyceryl monostearate; and additional fillers such as aluminum hydroxide, alumina, aluminum silicates, calcium carbonate, and talc and combinations thereof. These fillers may also be used in the gum base in various amounts. Preferably the amount of fillers when used will vary from about 4% to about 30% by weight of the final chewing gum.

In the instance where auxiliary sweeteners are utilized, the present invention contemplates the inclusion of those sweeteners well known in the art.

The colorant useful in the present invention include pigments such as titanium dioxide, that may be incorporated in amounts of up to about 1% by weight, and preferably up to about 0.6% by weight. Also, the colorants may include other dyes suitable for food, drug and cosmetic applications, known as F.D. & C. dyes and the like. The materials acceptable for the foregoing spectrum of use are preferably water-soluble. Illustrative examples include indigoid dye, known as F.D. & C. Blue No. 2, which is the disodium salt of 5,5,-indigotindisulfonic acid. Similarly, the dye known as F.D. & C. Green No. 1 comprises a triphenylmethane dye and is the monosodium salt of 4-[(4-N-ethyl-p-sulfobenzylamino)-diphenylmethylene]-[1-(N-ethyl-N-p-sulfoniumbenzyl)-2,5-cyclohexadienimine]. A full recitation of all F.D. & C. and D. & C. dyes and their corresponding chemical structures may be found in the *Kirk-Othmer Encyclopedia of Chemical Technology*, in Volume 5, at pages 857-884, which text is accordingly incorporated herein by reference.

In one preferred embodiment of the invention, the composite delivery system is first prepared by preparing an encapsulating matrix. In a 100 gram preparation of a delivery system, about 75 grams of hydrogenated soybean oil is mixed with 2 grams of distilled monoglycerides and melted at 70°-80° C. Three grams of lecithin, preferably Alcolec F-100, are dissolved in the mixture in a mixer set by a propeller type mixture at 1500 rpm. 0.02% or 20 milligrams of an anti-foaming agent is added at this stage. 20 grams of aspartame is then dispersed into the mixture and mixing continued for 15 minutes. While maintaining the dispersion at 70°-80° C., the dispersion is sprayed through a suitably equipped spray drying system into an air cooled chamber. The spray rate is maintained between about 350 and about 500 grams per minute, with atomizing air pressure set at 30-40 p.s.i.g. The resulting spray congealed particles will consist of granules varied in size from about 10 microns to 400 microns in diameter with the mean particle size being approximately 200 microns. FIGS. 1 and 2 show the effectiveness of the anti-foaming agent in aiding in the protection of the aspartame via the hydrogenated soybean oil fatty acid attachment as indicated by the limited effect of water on the viscosity of the matrix.

While the temperature during the spraying of the dispersion should be maintained at temperatures above about 60° C., it is best to maintain the temperature between about 70°-85° C. Similarly, it is best to maintain the temperature between about 70°-85° C. during the melting of the encapsulating matrix. The matrix composite preferably contains less than 0.2% water.

The following examples are given to illustrate the invention, but are not deemed to be limiting thereof. All percentages given throughout the specification are based upon 100% by weight, unless otherwise indicated.

EXAMPLE 1

This example demonstrates the use of the inventive sweetener delivery system as a means of preventing premature undesirable congealing of the matrix prior to spray congealing thereby promoting the stability in the matrix mixture.

Prior to encapsulation, the dispersion of aspartame in fat was prepared as outlined below:

|  | Control | Test |
|---|---|---|
| Hydrogenated Soybean Oil | 75.0% | 74.98% |
| Distilled Monoglycerides | 2.0% | 2.0% |
| Lecithin (Alcolec F-100) | 3.0% | 3.0% |
|  | (0.5-10)% | (0.5-10)% |
| Aspartame | 20.0% | 20.0% |
|  | (2-40%) | (2-40%) |
| Anti-foaming Agent | 0.0% | 0.02% |

A mixture of 75 grams of hydrogenated soybean oil and 2 grams of distilled monoglyceride was melted at 70°-80° C. To this mixture 3 grams of Lecithin was added and mixed by a propeller type mixer set at 1500 rpm until it dissolved. To the TEST formulation 0.2% of anti-foaming agent was added. Aspartame was dispersed to give a homogenous dispersion. The molten mixture was then fed into a heat controlled, high pressure nozzle and sprayed under controlled pressure.

When running the control it has been found that abnormal viscosity increase was occasionally observed, which eventually resulted in the complete congealing of the dispersion in the tank. This congealing effect, it was suspected, could have been caused by the presence of small amounts of moisture in the raw materials (example: Alcolec F-100), or by the presence of air-born humidity.

The experiment outlined hereby demonstrated that:

1. The congealing effect is indeed caused by the presence of moisture at approximately 0.2% and above (control on FIG. 1).

2. The addition of silicone based anti-foaming agent is beneficial for prevention of the congealing effect, as well as ensuring a more stable dispersion viscosity.

The Effect of Moisture on Viscosity

The TEST and CONTROL APM/Fat dispersions were prepared as outlined above.

The dispersions were maintained at the constant temperature of 80.5 (+/−0.5) °C., while being mixed at 900 rpm using a propeller type agitator. This temperature represents the highest to occur under present processing conditions.

Initial viscosity was measured using a Brookfield viscometer at 50 rpm, HA#1 spindle.

Water was added in small (0.05-0.1%) increments, and viscosity was measured at 5.0 minutes following each addition.

Results are outlined in the Table below, and the viscosity versus moisture relationship is shown in FIG. 1.

| Water Added | Viscosity (cps) | |
|---|---|---|
| | No Anti-foaming Agent CONTROL | With Anti-foaming Agent TEST |
| 0 | 46 | 50 |
| 0.1 | 46 | 49 |
| 0.2 | 100 | 50 |
| 0.25 | 384 | 52 |
| 0.3 | 1040* | 54 |
| 0.5 | — | 720 |

*Rapid congealing occurred

EXAMPLE 2

This example demonstrates the use of higher amounts of anti-foaming agent in formulations similar to the test run in Example 1.

The composition consisted of:

| | Test | Control |
|---|---|---|
| Hydrogenated Soybean Oil | 74.94% | 75.0% |
| Distilled Monoglycerides | 2.0% | 2.0% |
| Lecithin | 3.0% | 3.0% |
| Aspartame | 20.0% | 20.0% |
| Anti-foaming Agent | 0.06% | — |

The composition was prepared as follows: The encapsulating fat matrix of 74.94 grams of hydrogenated soybean oil was melted at 70°-80° C. 2 grams of distilled monoglyceride and 3 grams of lecithin were added and mixed at a rate of 900-1300 rpms using a propeller type mixer until the mixture was dissolved. The anti-foaming agent was then added to the TEST sample at this point, while the mixing continued and while the temperature was maintained at 70°-80° C. Aspartame was dispersed using a propeller type mixer, set at about 1200 rpm for 15 minutes. The viscosity of the dispersion at 79±1° C. was measured using a Brookfield viscometer HA, Spindle #2 at 50 rpm. Water was added at 0.2-1.0 ml increments, every 5 minutes, and viscosity was measured again until the desired congealing effect was induced. The dispersion was mixed using a propeller type mixer at 900-1300 rpm between additions.

As indicated below, the results of the test showed that the anti-foaming agent reduced the tendency of congealing by approximately 30%.

| | VISCOSITY, CPS @ 25° C. | |
|---|---|---|
| % Water Added | Test SPL (with anti-foam | Control |
| 0 | 51.20 | 56 |
| 0.10 | 51.20 | 56 |
| 0.20 | 52.80 | 72 |
| 0.25 | — | 139 |
| 0.30 | 60.80 | 634 |
| 0.35 | — | 32,000 |
| 0.40 | 360.0 | |
| 0.45 | 2160.0 | |

EXAMPLE 3

The procedure of Example 1 was repeated with the following composition:

| | Test | Control |
|---|---|---|
| Hydrogenated Palm Oil | 67.47% | 67.5% |
| Distilled Monoglycerides | 8.0% | 8.0% |
| Lecithin | 8.0% | 8.0% |
| Aspartame | 16.5% | 16.5% |
| Anti-foaming Agent | 0.03% | — |

This composition was processed according to the procedure of Example 1. The results of the test which are set forth below show that the anti-foaming agent reduced the tendency of congealing by about 50%.

| | VISCOSITY, CPS @ 25° C. | |
|---|---|---|
| % Water Added | Test SPL (with anti-foaming agent) | Control |
| 0 | 51.2 | 49.6 |
| 0.10 | — | 59.2 |
| 0.15 | 52.8 | 64.0 |
| 0.20 | 51.2 | 232.0 |
| 0.25 | 51.2 | 350.0 |
| 0.30 | 56.0 | 450.0 |
| 0.35 | 54.4 | 504.0 |
| 0.40 | 57.6 | 610.0 |
| 0.45 | 70.4 | 720.0 |
| 0.50 | 140.8 | 960.0 |
| 0.55 | 312.0 | 1050.0 |
| 0.60 | 472.0 | |
| 0.65 | 792.0 | |
| 0.70 | | |

As shown by the examples, the addition of an anti-foaming agent to the fat/dispersion melt, prior to dispersing the active ingredient, was found to improve the encapsulation (spray congealing) process. This is evidenced by the fact that the viscosity of the dispersion can be maintained stable for a longer time period and that the dispersion can accommodate a higher percentage of active ingredient without congealing.

The invention thus being described, it will be obvious that the same may be varied in many ways. Such variations are not to be regarded as a departure from the spirit and scope of the invention and all such modifications are intended to be included within the scope of the claims.

What is claimed is:

1. A composite delivery system which comprises a mixture of spray congealed particles having a substantially hydrophobic exterior, the particles which comprise:
   (a) a core material selected from the group consisting of sweeteners, flavoring agents, and mixtures thereof; and
   (b) a hydrophobic encapsulating matrix surrounding the core, wherein the matrix comprises:
      (i) about 0.5% to about 20% fat soluble lecithin;
      (ii) about 65% to about 90% of an edible material having a melting point in the range of about 25° C. to about 100° C. selected from the group consisting of (a) a fatty acid having an iodine value of about 1 to about 10; (b) natural waxes; (c) synthetic waxes; and (d) mixtures thereof;
      (iii) about 0.5% to about 20% of a glyceride; and
      (iv) a silicone based anti-foaming agent in a concentration of about 0.001% to about 0.5%; said composite delivery system having a melting point in the range of from about 20° C. to about 90° C.

2. The composite of claim 1, wherein the sweetening agent is selected from the group consisting of water-soluble sweetening agents, water-soluble artificial sweeteners, dipeptide based sweeteners, and mixtures thereof.

3. The composite of claim 2, wherein the sweetening agent is present in an amount of about 0.005% to about 55% by weight.

4. The composite of claim 2, wherein the sweetener is aspartame which is present in an amount of about 0.01% to about 30%.

5. The composite of claim 2, wherein the sweetener is saccharin or its salts which is present in an amount of about 0.05% to about 8.0% by weight.

6. The composite of claim 2, wherein the sweetener is a combination of up to about 5.0% aspartame, about 0.5% to about 8.0% saccharin and its salts and about 0.5% to about 8.0% acesulfame-K.

7. The composite of claim 1, wherein the delivery system contains less than 0.3% water.

8. The composite of claim 1, wherein the sweetener is selected from the group consisting of xylose, ribose, glucose, mannose, galactose, fructose, dextrose, polydextrose, cellulose, sucrose, maltose, partially hydrolyzed starch or corn syrup solids, palatin, sorbitol, xylitol, mannitol, maltitol, and mixtures thereof.

9. The composite of claim 1, wherein said sweetener is selected from the group consisting of sodium saccharin, calcium saccharin, saccharin acid, cyclamate salts, chlorosucrose derivatives, glycyrrhizin, acesulfame-K, L-aspartyl-L-phenylalanine methyl ester, dihydrochalcone, 3,4-dihydro-6-methyl-1,2,3-oxathiazine-4-1-2,2-dioxide, steviosides, talin, and mixtures thereof.

10. The composite of claim 1, wherein the fatty acid is selected from the group consisting of hydrogenated palm oil, hydrogenated palm kernel oil, hydrogenated peanut oil, hydrogenated rapeseed oil, hydrogenated rice bran oil, hydrogenated soybean oil, hydrogenated cottonseed oil, hydrogenated sunflower oil, partially hydrogenated soybean oil, partially hydrogenated cottonseed oil, candellila wax, carnauba wax and mixtures thereof.

11. The composite of claim 1, wherein the anti-foaming agent is selected from the group consisting of polydimethylsiloxane, dimethyl polysiloxane, silicone fluid, silicone anti-foam emulsion, silica gel, silicon dioxide, compounded silicone fluid, and simethicone.

12. The composite of claim 1, wherein the glyceride is selected from the group consisting of monoglycerides, diglycerides, glyceryl monostearate, glyceryl tristearate and mixtures thereof.

13. The composite of claim 12, wherein the glyceride is a monoglyceride of a fat selected from the group consisting of soybean oil, palm oil and lard.

14. A method of preparing a composite sweetener delivery system, which comprises:
   preparing a hydrophobic encapsulating matrix containing about 0.5% to about 20% fat soluble lecithin, about 65% to about 90% of an edible material having a melting point in the range of about 25° C. to about 100° C. selected from the group consisting of (a) a fatty acid having an iodine value of about 1 to about 10, (b) natural waxes, (c) synthetic waxes, and (d) mixtures thereof;
   mixing said matrix;
   melting said encapsulating matrix material at a temperature above about 60° C.;
   adding an anti-foaming agent to said matrix and mixing until a homogeneous mixture is obtained;
   mixing a glyceride into said matrix, followed by adding a sweetening agent to the matrix to encapsulate the sweetening agent; and
   spray drying the resulting composition to form a composite sweetener delivery system comprising spray congealed particles having a substantially hydrophobic exterior, the particles which comprise a core of sweetening agent encapsulated in the hydrophobic matrix.

15. The method according to claim 14, wherein the spray congealed particles of said composite sweetener delivery system vary in size from about 10 microns to about 400 microns in diameter.

16. The method according to claim 14, wherein the encapsulating matrix material is melted at a temperature between about 70° C. and about 85° C.

17. The method according to claim 14, wherein the sweetening agent is selected from the group consisting of water-soluble sweetening agents, water-soluble artificial sweeteners, dipeptide based sweeteners and mixtures thereof.

18. The method of claim 17, wherein said sweetening agent is present in an amount of about 0.005% to about 55% by weight.

19. The method according to claim 17, wherein the sweetener is selected from the group consisting of xylose, ribose, glucose, mannose, galactose, fructose, dextrose, polydextrose, cellulose, sucrose, maltose, partially hydrolyzed starch, partially hydrolyzed corn syrup solids, palatin, sorbitol, xylitol, mannitol, maltitol, and mixtures thereof.

20. The method according to claim 15, wherein said sweetener is selected from the group consisting of sodium saccharin, calcium saccharin, saccharin acid, cyclamate salts, chlorosucrose derivatives, dipeptide compounds, acesulfame-K, L-aspartyl-L-phenylalanine methyl ester, dihydrochalcone, 3,4-dihydro-6-methyl-1,2,3-oxathiazine-4-one-2,2-dioxide, steviosides, talin, and mixtures thereof.

21. The method according to claim 17, wherein the sweetener is aspartame which is present in an amount of about 0.01% to about 30%.

22. The method according to claim 17, wherein the sweetener is saccharin or its salts which is present in an amount of about 0.05% to about 8.0% by weight.

23. The method according to claim 17, wherein the sweetener is a combination of up to about 5.0% aspartame, about 0.5% to about 8.0% saccharin and its salts and about 0.5% to about 8.0% acesulfame-K.

24. The method according to claim 14, wherein the fatty acid is selected from the group consisting of hydrogenated palm oil, hydrogenated palm kernel oil, hydrogenated peanut oil, hydrogenated rapeseed oil, hydrogenated rice bran oil, hydrogenated soybean oil, hydrogenated cottonseed oil, hydrogenated sunflower oil, partially hydrogenated soybean oil, partially hydrogenated cottonseed oil, candellila wax, carnauba wax and mixtures thereof.

25. The method according to claim 14, wherein the anti-foaming agent is selected from the group consisting of polydimethylsiloxane, dimethyl polysiloxane, silicone fluid, silicone anti-foam emulsion, silica gel, silicon dioxide, compounded silicone fluid, and simethicone.

26. The method according to claim 14, wherein the glyceride is selected from the group consisting of monoglycerides, diglycerides, glyceryl monostearate, glyceryl tristearate, and mixtures thereof.

27. The method according to claim 14, wherein the glyceride is a monoglyceride of a fat selected from the group consisting of soybean oil, palm oil and lard.

* * * * *